3,035,052
ARSENIC-CONTAINING DERIVATIVES OF DIMERCAPTO-SUCCINIC ACID
Ernst A. H. Friedheim, 333 W. 52nd St., New York, N.Y.
No Drawing. Filed Mar. 2, 1959, Ser. No. 796,250
6 Claims. (Cl. 260—242)

This invention relates to therapeutically active organometallic compounds containing trivalent arsenic and has particular relation to 1,3-dithia-2-arsa-4,5-dicarboxy-cyclopentane compounds corresponding to the general formula

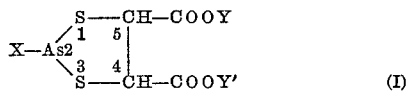  (I)

in which Y and Y' may be the same or different and stand for H or salt-forming inorganic cations, such as Na, K, Li, $NH_4$, Ca, Mg, or radicals of a salt-forming organic base, such as mono- and di-alkylamines, e.g. ethylamine, diethylamine, glucoseamine or N-methylglucamine; and X stands either for the monovalent radical of a substituted benzene ring or for an aromatic or aliphatic mono- or dimercapto radical of the formula R—S— or

e.g. for

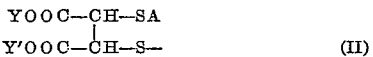  (II)

wherein A stands for H or a radical of the formula

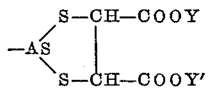

When X stands for said radical of a substituted benzene ring, the third valency of the arsenic is bound to a carbon atom and when X stands for said aromatic or aliphatic mono- or dimercapto-radical, said third valency of the arsenic is bound to an S-atom of such radical.

Both series of the above mentioned compounds have valuable properties in the treatment of certain parasitic diseases, such as those caused by protozoan and metazoan parasites, e.g. human trypanosomes and certain helminths, e.g. *W. bancrofti* and *O. volvulus.*

The advantages presented by the arsenic compounds embodying the present invention, over previously known arsenic compounds are brought out by the following considerations:

Compounds containing a 1,3-dithia-2-arsacyclopentane structure, such as the reaction product of melarsen with BAL, are known to have valuable properties in the treatment of human African sleeping sickness, and other parasitic diseases such as yaws, amoebic dysentery, filariasis, but their medical application is restrained by the fact that they are insoluble in water and must be applied dissolved in organic solvents, such as propylene glycol, by strictly intravenous injections. Painful inflammations may result when accidentally the propylene glycol solution is injected into the subcutaneous tissue. As a consequence the usefulness of the known dithia-arsacyclopentane compounds mentioned above, is limited in respect to routine mass treatment under field conditions of African sleeping sickness, because the treatment must be carried out by well-trained personnel under medical supervision. Even so, patients with inapparent veins, or veins obstructed by previous injections of propylene glycol solutions, cannot be treated e.g. with the reaction product of melarsen with BAL, which offers to date the only chance of a cure in the deadly form of encephalitis due to *T. rhodiense* and tryparsamide resistant *T. gambiense*

The dithia-arsa-dicarboxycyclopentane compounds, embodying the present invention, are water-soluble due to the presence of the 2-carboxyl groups in the heterocyclic sulfur-containing moiety and they have been found to have valuable therapeutic effects in the treatment of the above mentioned parasitic diseases. Therefore the compounds of the present invention can be readily applied in aqueous solution by the subcutaneous and intramuscular route and can thus overcome the difficulties described above in the treatment of sleeping sickness.

The useful therapeutic effects of the compounds of this invention in human sleeping sickness, particularly in the advanced forms of the disease affecting the central nervous system, could not be expected. On the contrary, past experience has shown that carboxyl groups interfere with the therapeutic trypanocidal effect of organic arsenicals. To date no valid accepted drug is known for the treatment of human sleeping sickness containing carboxyl groups. The only compound of this kind proposed, but finally rejected, is Eagle's gamma-4-arsenosophenyl butyric acid. This carboxylic acid containing compound is somewhat effective in experimental trypanosomiasis and early stages of human sleeping sickness, where the trypanosomes are limited to the blood and lymph glands, but it is ineffective in the human disease as soon as the central nervous system is infected. It would seem that in the known compounds the carboxyl group, connected to the benzene ring moiety, prevents the drug from passing from the blood into the spinal fluid.

In contrast to the above, it has now been found that the benefit of the solubilizing effect of carboxyl groups can be fully exploited without detriment to the therapeutic effect in the central nervous system forms of African sleeping sickness, if the carboxyl groups are attached to the dithia-arsacyclopentane ring, e.g. by the condensation of a phenylarsonoxide with dimercapto succinic acid, according to the present invention.

The novel compounds embodying the present invention, in which the 3 valences of trivalent arsenic are bound to three sulfur atoms, of which two are part of arsa-dithia-dicarboxy-cyclopentane, have exceptional therapeutic value in the treatment of certain human parasitic diseases such as onchocerciasis. They are further of interest because they have been found to exercise a noxious effect on rapidly multiplying cells such as are found in intra-uterine embryonic forms of the parasitic worm *Onchocerca volvulus,* and in tumors such as the sarcoma 180 mouse tumor system.

The compounds having such effect correspond to the structural formula, in which Y and Y' have the meaning defined above.

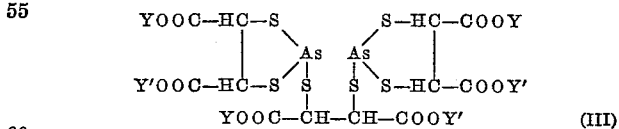  (III)

An additional essential advantage of compounds according to the present invention, is their great stability and relatively low toxicity.

While in some chemotherapeutic applications the antimony of organometallic compounds has to a certain extent and within certain limits similar effects as arsenic, it is noteworthy that the above mentioned impeding effect on tumors of the arsenic compound corresponding to the above Formula III is not found in the analogous compounds of antimony and bismuth, the other elements of the fifth column of the periodic system which are known to have chemotherapeutic potentialities.

The compounds embodying the present invention can be prepared in liquid aqueous or organic reaction media. In aqueous reaction medium an arsenic compound, e.g. one mol of a phenylarsenoxide is stirred with an aqueous solution of one mol of a mono- or di-alkali salt of dimercapto succinic acid, until all arsenoxide has passed into solution. The reaction mixture may be isolated from the filtered reaction mixture by (1) evaporation, preferably at reduced pressure and at low temperature;
(2) by precipitation with an organic solvent such as alcohol or acetone, or
(3) by precipitation with a strong acid, such as HCl. In this case, the precipitate represents the water insoluble free acid corresponding to Y=Y'=H.

In a liquid organic reaction medium, the desired product—in which X stands for the monovalent radical of a substituted benzene ring—can be obtained by reacting e.g. a phenylarsenoxide or the corresponding phenylarsendichloride in an organic solvent, such as ethanol or methanol, in aequimolar proportion with dimercapto succinic acid. The reaction product can be isolated (a) in form of the free acid by evaporation of the reaction mixture to dryness, or, (b) in form of its salts by addition of one or two mols of a base, or an alkali or earth alkali salt of a weak acid, such as acetic acid. Instead of starting with phenylarsenoxide, the corresponding pentavalent phenylarsonic acid can be used as starting material, whereby 2 mols of dimercapto succinic acid have to be used, 1 mol for reduction to the trivalent arsenic compound and the second mol for reacting with the latter.

Free acid compounds of the invention, i.e. compounds, in which Y and/or Y' stand for H in the above Formula I can be converted into the corresponding salts by treatment with aqueous alkali and subsequent evaporation, or precipitation with an organic solvent, e.g. alcohol.

*Example I*

16 g. of melarsen oxide are stirred at 30° C. with a solution of 10 g. of dimercapto succinic acid and 5.9 g. of sodium carbonate in 200 cc. of water until practically all solids have passed into solution. The reaction product is isolated from the charcoaled and filtered solution by evaporation at reduced pressure or by precipitation with alcohol.

The same result is obtained if 37 g. of melarsen, i.e. the pentavalent parent compound of melarsen oxide, is reacted in water at a pH from 7–8 with 20 g. of dimercapto succinic acid. The reaction product is isolated in form of the free acid by precipitation with HCl and transformed into the desired alkali salt, as described above.

*Example II*

10 g. of dimercapto succinic acid dissolved in 300 cc. of methanol of 50°–60° C. are added with stirring to a hot solution of 16 g. of melarsen oxide in 300 cc. of hot methanol. A white precipitate is formed, which is filtered off, washed with hot methanol, suspended in 150 cc. of water and dissolved by addition of a 20% solution of KOH to a pH of 8. 22 g. of anhydrous potassium acetate dissolved in 150 cc. of hot ethanol are added with stirring to the filtered reaction mixture. The resulting white crystalline precipitate representing the potassium salt of 2 (4-melaminyl-phenylarsa)-1,3-dithia-4,5-dicarboxycyclopentane is filtered off, washed with ethanol and dried at reduced pressure. It may be re-crystallized out of hot water.

*Example III*

10 g. of acetarsone and 13.3 g. of dimercapto succinic acid are refluxed in 300 cc. of ethanol. The resulting clear solution is saturated with anhydrous sodium acetate. The resulting white crystalline precipitate containing the mono-sodium salt of 2-(4'-hydroxy-3'-acetylaminophenylarsa)-1,3-dithia-4,5-dicarboxycyclopentane, is filtered off, washed with ethanol and recrystallized out of water or aqueous alcohol.

*Example IV*

10 g. of 2-amino-4-phenoldichlorarsine hydrochloride and 15.5 g. dimercapto succinic acid are refluxed for about 20 minutes in 300 cc. of ethanol. The residue obtained by evaporation of the reaction mixture is taken up in 300 cc. of water, and enough NaOH to produce a solution of pH 7–8. The filtered reaction mixture is precipitated with alcohol. The resulting white powder is 2-(4'-hydroxy-3'-aminophenylarsa) - 1,3 - dithia - 4,5 - dicarboxycyclopentane, di-sodium salt.

*Example V*

24 g. p-arsenosophenylaminoacetamide (prepared by reduction of tryparsamide, with $SO_2$ in presence of KI) and 20 g. dimercapto succinic acid are boiled for about 10 minutes in 400 cc. ethanol. The reaction product, i.e. 2 (4'-aminoacetamidephenylarsa)-1,3-dithia-4,5-dicarboxycyclopentane is isolated in form of the free acid, by evaporation at reduced pressure, or in the form of the monosodium salt by saturation of the reaction mixture with anhydrous sodium acetate.

*Example VI*

20 g. of p-aminophenylarsenoxide (prepared by reduction of arsanilic acid as in Example 5) and 20 g. of dimercapto succinic acid are heated under reflux for about 10 minutes in 400 cc. of methanol. The reaction product, i.e. 2 (4'-aminophenylarsa)-1,3-dithia-4,5-dicarboxycyclopentane, is isolated in the form of the free acid by evaporation of the filtered reaction mixture, or, in the form of the potassium salt by saturation of the reaction mixture with anhydrous potassium acetate.

*Example VII*

3 mols of dimercaptosuccinic acid and 3 mols of sodium bicarbonate are dissolved in 10 parts by weight of water and stirred, in the presence of a wetting agent, with 1.05 mol of finely powdered $As_2O_3$ until nearly all the arsenic has passed into solution. From the filtered solution the reaction product is isolated by precipitation with an organic solvent such as methanol, ethanol, acetone or by evaporation to dryness, preferably in the vacuum, at a low temperature, for example 0° C.

The final product is a white powder corresponding to the formula $(HOOC\text{—}HCS\text{—}HCSCOONa)_3As_2$. It is soluble in water and insoluble in organic solvents such as alcohol, acetone, chloroform, ether.

*Example VIII*

3 mols of dimercaptosuccinic acid are dissolved in 20 parts by weight of methanol and stirred with 1.02 mol of freshly sublimed $As_2O_3$ until practically all solids have passed into solution. The filtered solution is saturated with anhydrous potassium acetate. A white precipitate is formed representing an acid potassium salt corresponding to the following formula $(HOOC.HCS\text{—}.HCS\text{—}.COOK)_3As_2$ (IV)

If in this example potassium acetate is replaced by sodium acetate the corresponding acid sodium salt is obtained.

In the foregoing examples sodium or potassium acetate can be replaced by an equivalent amount of magnesium or calcium acetate. In this case the resulting compound is the acid magnesium or calcium salt in which K is replaced by $$\frac{Mg}{2} \text{ or } \frac{Ca}{2}$$

*Example IX*

3 mols of dimercaptosuccinic acid and 2 mols of $AsCl_3$ are dissolved with stirring and warming in 25 parts by weight of ethanol. The filtered solution is evaporated under reduced pressure at 5° C. to dryness. The residue representing the free acid $(C_4H_4O_4S_2)_3As_2$ is dissolved in 20 parts by weight of water with addition of the necessary quantity of sodium bicarbonate.

The reaction product is isolated by precipitation with organic solvents such as acetone or isopropyl alcohol, filtered off, washed with the same organic solvents and dryed in vacuo to constant weight.

*Example X*

29 g. arsenic trioxide are dissolved with stirring and warming to 110° C. in 720 ml. of propylene glycol. The slightly turbid solution is charcoaled and filtered and brought to a temperature of 70° C. 72 g. of dimercaptosuccinic acid are added and brought into solution with stirring. The solution is charcoaled, filtered, 500 ml. of ethanol are added and the solution is run with stirring into a solution containing 114 g. of hydrated sodium acetate in 920 ml. of ethanol. A white precipitate is formed which is filtered off, washed with ethanol and dried in vacuo over sulfuric acid.

*Example XI*

The product obtained according to one of the Examples I to X, representing salts of succinic acid dimercaptides are dissolved in 5 parts by weight of water. The filtered solution is rendered acid to Congo red reagent paper by addition of hydrochloric acid. A white crystalline precipitate is formed representing the corresponding free acid. According to $Y=Y'=H$ in Formula I the free acid can be transformed into any salt desired in one of two ways: (A) The free acid is dissolved in water with the calculated amount of a base, and the resulting salt is precipitated by addition of an appropriate organic solvent, or by evaporation to dryness. (B) The free acid is dissolved in ethanol or methanol and an alcohol soluble salt or base containing the desired cation is added in calculated amounts, whereupon the desired salt precipitates in form of a white powder which is filtered off, washed with ethanol and dried in vacuo.

*Example XII*

19.8 g. $As_2O_3$ are dissolved with stirring and warming with 61.5 g. of thioglycolic acid in 500 cc. of water and enough ammonia to bring the reaction mixture to a pH of 8. 36.4 g. of dimercaptosuccinic acid are added. The reaction mixture, maintained at a pH of 8, is kept for 20 minutes at 80° C. On addition of hydrochloric acid to the cooled solution, to a pH of 2, a white precipitate is obtained corresponding to formula

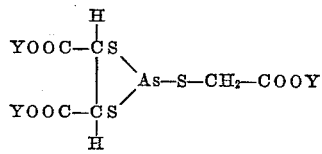

In the process of the above example, the thioglycolic acid may be replaced by an equivalent amount of another monothiol, for example monothioglycerol,

or cysteine, $SH-CH_2CH(NH_2)COOH$, in order to form the corresponding analogous compounds.

*Example XIII*

27.5 grams of 2-hydroxy-4-acetamino-phenyl-arsonic acid and 36.4 grams of dimercapto succinic acid and 21.6 grams of anhydrous sodium carbonate are heated under reflux in 500 cc. of water. The reaction mixture is acidified with hydrochloric acid. The resulting precipitate of 2(4' - acetamino - 2' - hydroxy - phenyl - arsa) - 1,3 - dithia-4,5-dicarboxy-cyclopentane is recrystallized out of 60% aqueous methanol and may be transformed into the corresponding sodium salt as in Example XI.

*Example XIV*

One mol of dimercapto succinic acid is dissolved in 20 times its weight of methyl alcohol and to the resulting solution 1 mol of $AsCl_3$ dissolved in 10 times its weight of $CH_3OH$ is slowly added dropwise with cooling, in order to keep the reaction mixture at ordinary room temperature. In the reaction product thus formed —Cl stands for X. Subsequently, ⅓ mol of thiophenol ($C_6H_5SH$) is introduced slowly, dropwise into the reaction mixture which is cooled, if necessary, in order to keep it at ordinary room temperature, i.e. 18–20° C. The reaction product is allowed to stand at about 0°–10° C. for 24 hours and the solvent is then evaporated at said temperature in order to separate the crystalline reaction product.

*Example XV*

36.4 parts by weight of dimercapto succinic acid dissolved in 70 parts by weight of methyl alcohol are added dropwise with stirring to 18 grams of $AsCl_3$ dissolved in 15 parts by weight of ice-cold methyl alcohol. The reaction mixture is stirred for 8 hours at 0°–4° C. and then evaporated under reduced pressure at 0°–10° C. to dryness. The residue is taken up in 20 parts by weight of water and sufficient sodium bicarbonate to bring the pH to 4.6. The filtered solution is precipitated with alcohol and recrystallized out of 60% aqueous ethanol. The sodium salt of the reaction product is thus obtained.

The meaning of the terms "acetarsone," "BAL" and "melarsen" used herein is well known in the art and is defined e.g. in the sixth edition of "The Merck Index of Chemicals and Drugs" (Rahway, New Jersey, 1952). The term "melarsen oxide" is used herein to denote the reduction product of melarsen, in which the pentavalent arsonate group is reduced to the corresponding radical of trivalent arsenic.

The compounds embodying the present invention are utilized in the treatment of the above mentioned diseases according to conventional methods of administration. For example, the compound prepared in the manner described in the above Examples I or II, can be administered by intramuscular or subcutaneous injection of an aqueous solution which contains said compound in the form of the Na or K salt in concentration of 5.0% and also contains 0.9% of sodium chloride or 5.0% of glucose. The single dose amounts to 2–4 mg. of said compound, per kg. of body weight of the patient, and one dose is administered daily on 4 consecutive days. After a pause of a week, said treatment with one daily dose is repeated. The exact amount of the single dose varies within the above mentioned limits in dependence on the condition of the patient.

Furthermore, in the treatment of onchocerciasis, compound corresponding to the above Formula III can be administered per os in the form of powder in gelatin capsules, preferably in the form of the sodium salt. The single dose amounts to 1–2 mg. per kg. body weight, depending on the condition of the patient, and one dose is administered daily for a week. The treatment can be repeated after a pause of 1–2 weeks. This compound can be administered also by intramuscular or subcutaneous injection of an aqueous solution containing 2–5% of the arsenic compound and 0.9% of NaCl or 5.0% of glucose.

In the above mentioned treatment of sarcoma, a dose of 55 to 188 mg. of the compound corresponding to Formula III, per kg. of body weight was administered to white rats once per day for 6 consecutive days in aqueous 0.9% sodium chloride solution by intraperitoneal injection.

It will be understood from the above that this invention is not limited to the specific steps, conditions, materials and other details specifically described above and can be carried out with various modifications without departing from the scope of the invention as defined in the appended claims.

The parts and percent mentioned herein are by weight if not otherwise stated.

What is claimed is:

1. As a therapeutically active compound a 1,3-dithia-2-arsa-4,5-dicarbocyclopentane corresponding to the structural formula

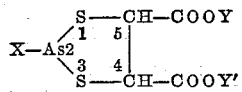

wherein Y and Y' is selected from the group consisting of H, Na, K, Li, NH$_4$, Ca, Mg, mono- and dialkylamines, glucoseamine and N-methylglucamine and X is selected from the group consisting of benzene ring radicals substituted in the benzene ring by a radical selected from the group consisting of —OH and amino radicals and having a free valency at a C-atom of the benzene ring; monovalent radicals of monomercapto carboxylic acids having the free valency at the S atom; thiophenols having the free valency at the S-atom; and radicals of organic dimercapto compounds of the formula

wherein R$_1$ stands for the radical

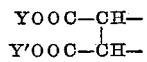

in which Y and Y' have the meaning defined above in connection with the first structural formula shown in this claim and A stands for a radical selected from the group consisting of H and radicals of the formula

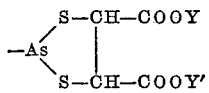

in which Y and Y' have the meaning defined above in connection with the first structural formula shown in this claim.

2. A compound corresponding to the formula

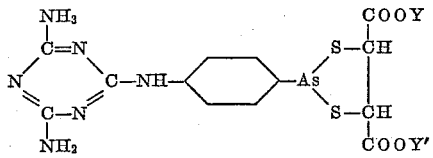

wherein Y and Y' is selected from the group consisting of Na, K, Li, NH$_4$, Ca, Mg, mono- and dialkylamines, glucoseamine and N-methylglucamine.

3. A compound corresponding to the formula

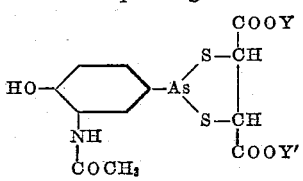

wherein Y and Y' is selected from the group consisting of Na, K, Li, NH$_4$, Ca, Mg, mono- and dialkylamines, glucoseamine and N-methylglucamine.

4. A compound corresponding to the formula

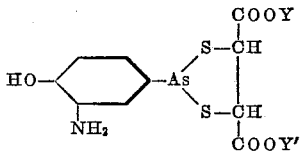

wherein Y and Y' is selected from the group consisting of Na, K, Li, NH$_4$, Ca, Mg, mono- and dialkylamines, glucoseamine and N-methylglucamine.

5. A compound corresponding to the formula

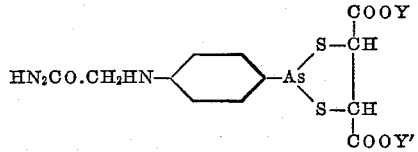

wherein Y and Y' is selected from the group consisting of Na, K, Li, NH$_4$, Ca, Mg, mono- and dialkylamines, glucoseamine and N-methylglucamine.

6. A compound corresponding to the formula

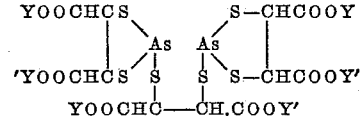

wherein Y and Y' is selected from the group consisting of Na, K, Li, NH$_4$, Ca, Mg, mono- and dialkylamines, glucoseamine and N-methylglucamine.

References Cited in the file of this patent

UNITED STATES PATENTS

| | | |
|---|---|---|
| 2,566,382 | Sweet et al. | Sept. 4, 1951 |
| 2,566,383 | Tillitson | Sept. 4, 1951 |
| 2,664,432 | Friedheim | Dec. 29, 1953 |
| 2,772,303 | Friedheim | Nov. 27, 1956 |
| 2,880,222 | Friedheim | Mar. 31, 1959 |